US006108564A

United States Patent [19]

Minkoff

[11] Patent Number: 6,108,564

[45] Date of Patent: Aug. 22, 2000

[54] INTERFERENCE REJECTION BY MEANS OF NULL-SPACE TRANSFORMATIONS

[75] Inventor: John Minkoff, Englewood, N.J.

[73] Assignee: Lucent Technologies, Inc., Murray Hill, N.J.

[21] Appl. No.: 09/001,852

[22] Filed: Dec. 31, 1997

[51] Int. Cl.[7] ........ H04Q 7/32

[52] U.S. Cl. ........ 455/561; 455/562; 342/357.08; 342/357.12

[58] Field of Search ........ 455/62, 63, 67.1, 455/67.3, 67.6, 450, 452, 561, 562, 161, 272, 73, 132, 277.1; 342/357, 357.12, 360, 423

[56] References Cited

U.S. PATENT DOCUMENTS

| | | | |
|---|---|---|---|
| 5,428,818 | 6/1995 | Meidan et al. | 455/436 |
| 5,530,725 | 6/1996 | Koch | 375/347 |
| 5,884,192 | 3/1999 | Karlsson et al. | 455/562 |
| 6,009,335 | 12/1999 | Murphy | 455/562 |

*Primary Examiner*—Wellington Chin
*Assistant Examiner*—Pablo Tran

[57] ABSTRACT

A technique for interference rejection at a sensor array is disclosed that employs a transformation on the output of the sensor array wherein the angular location of the source of each interfering signal constitutes the null-space of the transformation. For a sensor array of M sensor elements, the rejection of up to M−1 interferers is possible with a single transformation. One embodiment of the present invention comprises: receiving M signals, $x_0(t)$ through $x_{M-1}(t)$, at a frequency of ω radians/second at a sensor array comprising M spatially-disparate sensor elements, $x_0$ through $x_{M-1}$, wherein the M signals, $x_0(t)$ through $x_{M-1}(t)$, comprise a signal of interest incident on the sensor array at an angle φ, and an interfering signal incident on the sensor array at an angle $\psi_1$; transforming each of the M signals, $x_0(t)$ through $x_{M-1}(t)$, by a first factor based on ω, $\psi_1$, the speed of propagation of the interfering signal, and the distance between the sensor elements, $x_0$ through $x_{M-1}$, to form M intermediate products $s'_1(t)$ through $s'_{M-1}(t)$; and transforming each of the M intermediate products $s'_1(t)$ through $s'_{M-1}(t)$ by a second factor based on ω, Φ, $\psi_1$, the speed of propagation of the interfering signal, and the distance between the sensor elements, $x_0$ through $x_{M-1}$, to form M signals $s_1(t)$ through $s_{M-1}(t)$.

13 Claims, 3 Drawing Sheets

100

INTERFERENCE REJECTION BY MEANS OF NULL-SPACE TRANSFORMATIONS

FIELD OF THE INVENTION

The present invention relates to sensor arrays (e.g., sonar arrays, antenna arrays, etc.) in general, and, more particularly, to a technique for mitigating the effect of interfering signals at a sensor array.

BACKGROUND OF THE INVENTION

FIG. 1 depicts a schematic diagram of a portion of a typical wireless telecommunications system, which provides wireless telecommunications service to a number of wireless terminals (e.g., wireless terminals 101-1 through 101-3) that are situated within a geographic region. The heart of a typical wireless telecommunications system is Wireless Switching Center ("WSC") 120, which might be also known as a Mobile Switching Center ("MSC") or Mobile Telephone Switching Office ("MTSO"). Typically, Wireless Switching Center 120 is connected to a plurality of base stations (e.g., base stations 103-1 through 103-5) that are dispersed throughout the geographic area serviced by the system and to the local- and long-distance telephone offices (e.g., local-office 120, local-office 138 and toll-office 140). Wireless Switching Center 120 is responsible for, among other things, establishing and maintaining calls between wireless terminals and between a wireless terminal and a wireline terminal, which wireline terminal is connected to Wireless Switching Center 120 via the local and/or long-distance networks.

The geographic area serviced by a wireless telecommunications system is divided into spatially distinct areas called "cells." As depicted in FIG. 1, each cell is schematically represented by a hexagon; in practice, however, each cell has an irregular shape that depends on the topography of the terrain surrounding the cell. Typically, each cell contains a base station, which comprises the radios and antennas that the base station uses to communicate with the wireless terminals in that cell and also comprises the transmission equipment that the base station uses to communicate with Wireless Switching Center 120.

For example, when wireless terminal 101-1 desires to communicate with wireless terminal 101-2, wireless terminal 101-1 transmits the desired information to base station 103-1, which relays the information to Wireless Switching Center 120. Upon receipt of the information, and with the knowledge that it is intended for wireless terminal 101-2, Wireless Switching Center 120 then returns the information back to base station 103-1, which relays the information, via radio, to wireless terminal 101-2.

Typically, each base station receives one or more interfering signals at the same frequency as the signal of interest, which interferes with the capability of the base station to discern the signal of interest by lowering the signal-to-noise ratio of the signal of interest. Therefore, the need exists for a technique that mitigates the effect of the interfering signals.

SUMMARY OF THE INVENTION

Some embodiments of the present invention are capable of mitigating the effects of an interfering signal without some of the costs and disadvantages associated with techniques in the prior art. In particular, some embodiments of the present invention are computationally efficient and can mitigate the effects of an interfering signal that originates arbitrarily close to, in angular orientation, the source of the signal of interest. Furthermore, some embodiments of the present invention are suitable for signals of interest that employ spread spectrum modulation techniques (e.g., ID-95 CDMA, etc.).

Embodiments of the present invention advantageously employ a sensor array (e.g., an antenna array, a sonar array, etc.) comprising M sensor elements and an "open-loop" or two-step approach to interference rejection. In the first step, the angular location $\psi$ of the source of each interfering signal whose effect is to be mitigated or "rejected" is determined. In the second step, each signal received by a sensor element in the sensor array is transformed by a matrix that is constructed such that its "null space" is based on the angular location of the source of each interfering signal. The transformation is computationally simple, requires no matrix inversions and the rejection of multiple interfering signals is no more computationally complex than the rejection of a single interfering signal. For a sensor array of M sensor elements, the illustrative embodiment of the present invention is capable of rejecting up to M−1 interfering signals with each matrix transformation. The rejection of more than M−1 interfering signals can be accomplished by additional transformations.

One embodiment of the present invention comprises: receiving M signals, $x_0(t)$ through $x_{M-1}(t)$, at a frequency of $\omega$ radians/second at a sensor array comprising M spatially-disparate sensor elements, $x_0$ through $x_{M-1}$, wherein the M signals, $x_0(t)$ through $x_{M-1}(t)$, comprise a signal of interest incident on the sensor array at an angle $\phi$, and an interfering signal incident on the sensor array at an angle $\psi_1$; transforming each of the M signals, $x_0(t)$ through $x_{M-1}(t)$, by a first factor based on $\omega$, $\psi_1$, the speed of propagation of the interfering signal, and the distance between the sensor elements, $x_0$ through $x_{M-1}$, to form M intermediate products $s'_1(t)$ through $s'_{M-1}(t)$; and transforming each of the M intermediate products $s'_1(t)$ through $s'_{M-1}(t)$ by a second factor based on $\omega$, $\phi$, $\psi_1$, the speed of propagation of the interfering signal, and the distance between the sensor elements, $x_0$ through $x_{M-1}$, to form M signals $s_1(t)$ through $s_{M-1}(t)$.

DETAILED DESCRIPTION

Figure 1:
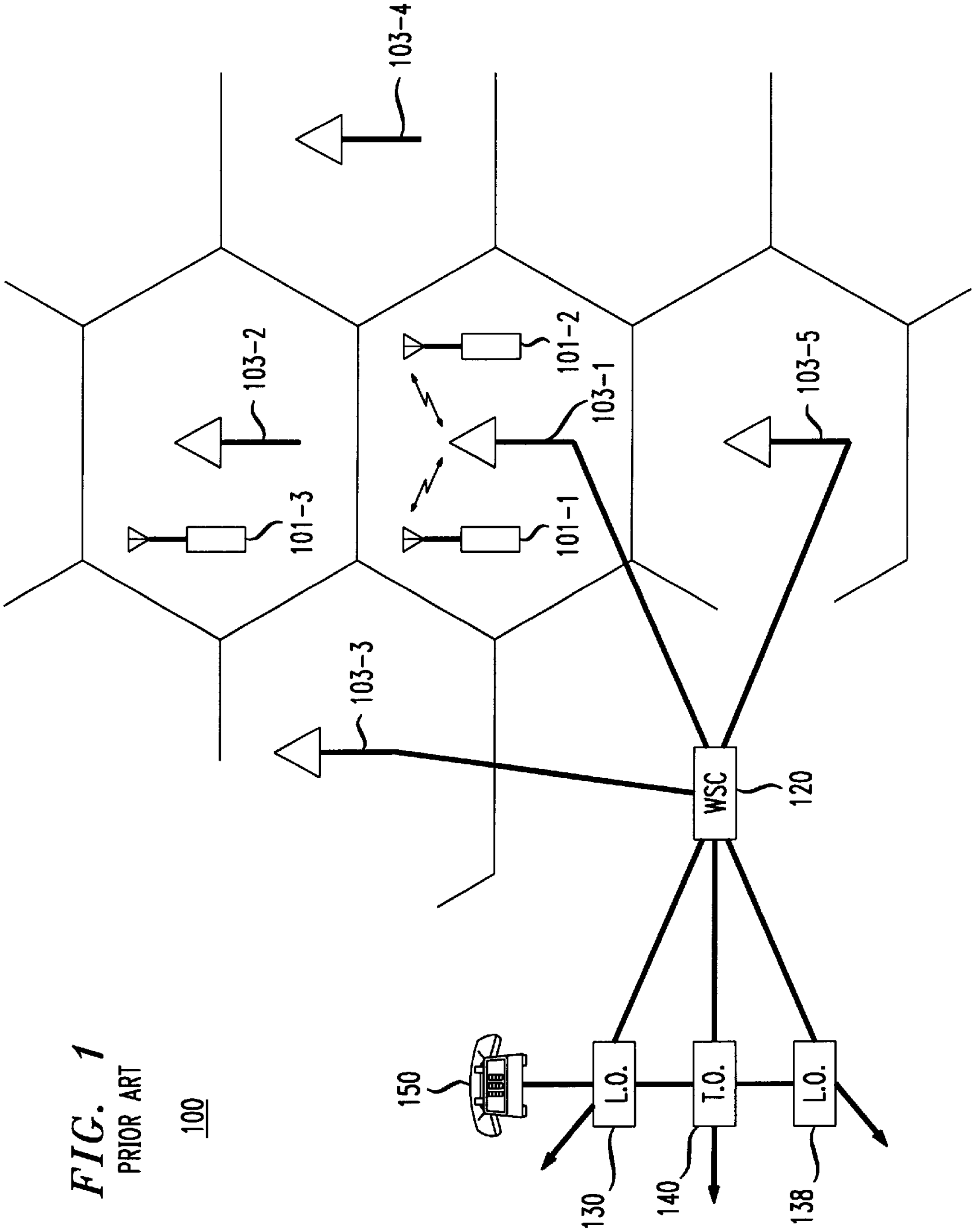
FIG. 1 PRIOR ART
FIG. 1 depicts a schematic diagram of a wireless telecommunications system in the prior art.
Figure 2:
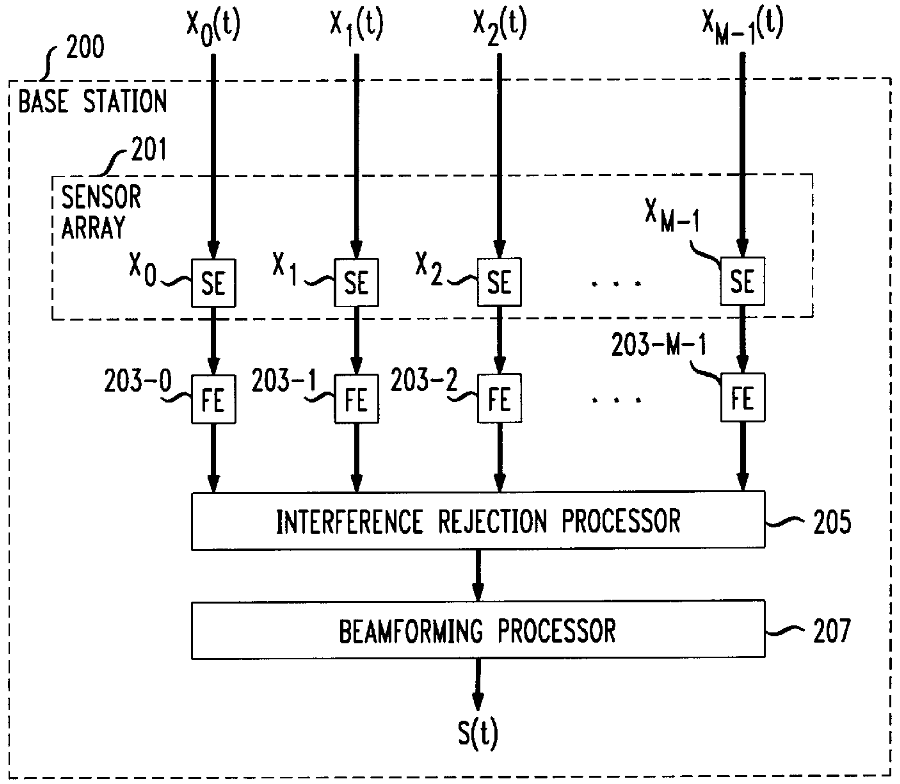
FIG. 2 depicts a block diagram of wireless telecommunications base station 300 in accordance with the illustrative embodiment of the present invention.

FIG. 2 depicts a block diagram of wireless telecommunications base station 300 in accordance with the illustrative embodiment of the present invention. Base station 300 advantageously comprises: sensor array 201, which comprises: M sensor elements, $x_0$ through $x_{M-1}$, M front-ends, 203-0 through 203-M−1, interference rejection processor 205, and beamforming processor 207, interconnected as shown.

Sensor elements, $x_0$ through $x_{M-1}$, are advantageously evenly spaced in a line and compose sensor array 201. It will be clear to those skilled in the art how to make and use embodiments of the present invention in which the sensor elements, $x_0$ through $x_{M-1}$, are not equally spaced or are not arranged linearly or are neither equally spaced or linearly arranged. For the purposes of this specification, the distance from sensor element $x_0$ to sensor element $x_n$ is defined as $d_n$.

Each sensor element, $x_0$ through $x_{M-1}$, is advantageously a conventional antenna element for receiving an electromagnetic signal. It will be clear to those skilled in the art how to make and use embodiments of the present invention in which each sensor element is a microphone element for receiving an acoustic signal.

As is well-known to those skilled in the art, each sensor element, $x_0$ through $x_{M-1}$, receives a time-varying signal, $x_0(t)$ through $x_{M-1}(t)$, respectively, in well-known fashion. Furthermore, each sensor element, $x_0$ through $x_{M-1}$, is advantageously capable of receiving the signal of interest, which can occupy either a single frequency or a range of frequencies. It will be clear to those skilled in the art how to make and use sensor array 201 and sensor elements $x_0$ through $x_{M-1}$.

Each front-end, 203-0 through 203-M−1, receives an incoming signal from one sensor element and digitizes it, in well-known fashion, at a sample rate and with a dynamic range that is appropriate for the amplitude and frequency range of the signal of interest. It will be clear to those skilled in the art that in some embodiments of the present invention each front end advantageously comprises a low-noise amplifier for amplifying the incoming signal before it is digitized. Furthermore, it will also be clear to those skilled in the art that in some embodiments of the present invention each front end advantageously comprises a downconverter so that the digitizer can operate on intermediate frequencies. It will be clear to those skilled in the art how to make and use front-end 203-0 through 203-M−1.

Interference rejection processor 205 and beamforming processor 207 are depicted in FIG. 2 as separate elements, for pedagogical purposes, to accentuate the difference in the function each performs. In practice, however, each can be implemented either separately or together. Advantageously, both interference rejection processor 205 and beamforming processor 207 are implemented together as an appropriately-programmed general purpose computer or digital signal processor. Alternatively, either or both of interference rejection processor 205 and beamforming processor 207 can be implemented in special-purpose hardware.

Figure 3:
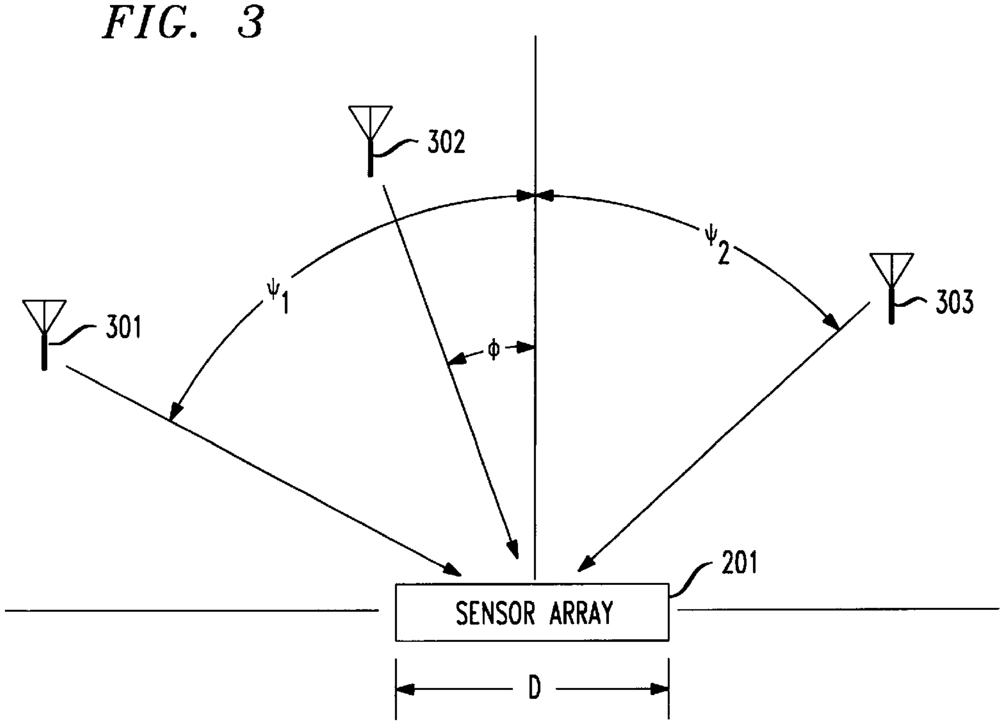
FIG. 3 depicts a map of the relative angular relationship of sensor array 201 to three illustrative signal sources.

FIG. 3 depicts a map of the relative angular relationship of sensor array 201 to three illustrative signal sources: signal source 301, signal source 302 and signal source 303. As shown in FIG. 3, signal source 302 radiates the signal of interest and signal sources 301 and 303 radiate interfering signals. When the frequency of the signal of interest has a wavelength of λ and a signal source is much farther than:

$$D = \frac{d^2(M-1)^2}{\lambda} \quad \text{(Eq. 1)}$$

then that signal source is in the far field of the sensor array and the signal can be considered as incident on the sensor array as a plane wave, where d is the distance between adjacent sensor elements. It will be clear to those skilled in the art how to adjust the following factors when the signal source is not in the far field of the sensor array.

In accordance with FIG. 3, the signal of interest from signal source 302 is incident on sensor array 201 at an angle of $\phi$, and the interferer from signal source 301 is incident on sensor array 201 at an angle of $\psi_1$, and the interferer from signal source 303 is incident on sensor array 201 at an angle of $\psi_2$.

Figure 4:
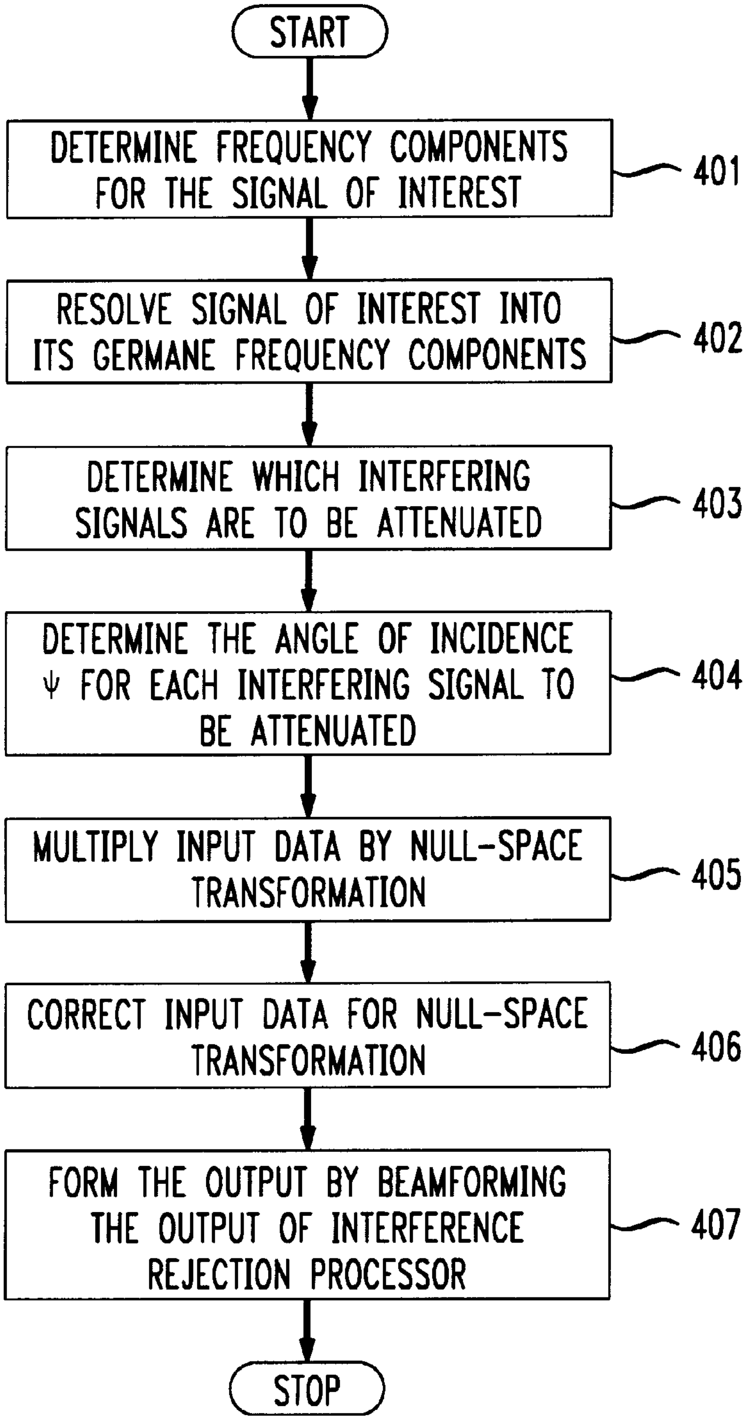
FIG. 4 depicts a flowchart of the operation of the illustrative embodiment of the present invention.

FIG. 4 depicts a flowchart of the steps performed by interference rejection processor 205 and beamformer 207 in accordance with the illustrative embodiment of the present invention. Because both interference rejection processor 205 and beamforming processor 207 advantageously operate on only one frequency component of the input signal at a time, at step 401, the frequency components of the signal of interest are determined, in well-known fashion. For example, if the signal of interest is a narrowband amplitude-modulated signal at a carrier frequency of c radians/second, then the illustrative embodiment need only be concerned with frequency components at that one frequency. Alternatively, if the signal of interest is a wideband signal (e.g., an acoustic voice signal, etc.), then the number and frequency of the frequency components of that wideband signal must be determined, and processed in steps 405–407 separately.

Again, because both interference rejection processor 205 and beamforming processor 207 advantageously operate on only one frequency component of the input signal at a time, at step 402, interference rejection processor 205 advantageously resolves the signal of interest from each sensor element into its germane frequency components. As is well-known in the art, the signal of interest can be resolved into its germane frequency components using, for example, a discrete fourier transform ("DFT") on each of the input signals, $x_0(t)$ through $x_{M-1}(t)$.

Although an infinite number of interfering signals can be incident on sensor array 201, interference rejection processor 205 is only capable of rejecting N of them, where $0 \leqq N \leqq M-1$. Therefore, at step 403, the interfering signals to be mitigated must be determined, in well-known fashion. Advantageously, an interfering signal is identified by its angle of incidence $\psi$ on sensor array 201.

At step 404, the angle of incidence $\psi$ of each interfering signal to be mitigated must be determined. Because the illustrative embodiment is an open-loop system, the step of determining the angle of incidence $\psi$ of each interfering signal is distinct from the step of mitigating the effect of the interfering signal. It will be clear to those skilled in the art how to determine the angle of incidence $\psi$ of each interfering signal on the sensor array that is to be mitigated. For example, the multiple signal characterization ("MUSIC") algorithm is typical of an algorithm that determines the angle of incidence of interfering signals. See "Multiple Source DF Signal Processing: An Experimental System," R. O. Schmidt et al., IEEE Transactions on Antennas and Propagation, Vol. AP-34, No. 3, March 1986, pp. 281–290.

After the N interfering signals have been identified, and their respective angles of incidence, $\psi_m$, determined, for m=1 to N, then at step 405 the input to sensor array 201 is transformed by transforming the input signals, $x_0(t)$ through $x_{M-1}(t)$, by a factor, A, to form an intermediate product, S'(t):

$$S'(t) = AX(t) \quad \text{(Eq. 2)}$$

where X(t) is a column vector that equals:

$$X(t) = \begin{bmatrix} x_0(t) \\ x_1(t) \\ \vdots \\ x_{M-1}(t) \end{bmatrix} \quad \text{(Eq. 3)}$$

and A equals the matrix:

$$A = J - \sum_{m=1}^{N} v_m v_m^\dagger \quad \text{(Eq. 4)}$$

where J is the identity matrix of rank M, $v_m$ is a row vector and $v_m^\dagger$ is the conjugate transpose of $v_m$. The row vector $v_m$ is based on the angle of incidence, $\psi_m$, and the number of sensor elements in sensor array 201, and is obtain from the well-known Gram-Schmidt process. *Linear Alegebra and Its Applications*. 2nd Ed., G. Strang, Academic Press, Inc., pp. 129, presents a lucid tutorial on the Gram-Schmidt process. For example:

$$v_1 = \frac{I_1}{|I_1|}, \text{ so that } |v_1|^2 = 1 \quad \text{(Eq. 5)}$$

and $I_1$ is a column vector based on the angle of incidence of $\psi_1$. $I_1$ equals:

$$I_1 = \begin{bmatrix} e^{i\omega\mu_{1,0}} \\ e^{i\omega\mu_{1,1}} \\ e^{i\omega\mu_{1,2}} \\ \vdots \\ e^{i\omega\mu_{1,M-1}} \end{bmatrix} \quad \text{(Eq. 6)}$$

where ω represents the frequency in radians/second of the frequency component being processed of the first interferer, and $$\mu_{i,n} = \frac{d_n \sin\psi_i}{c} \quad \text{(Eq. 7)}$$

where $d_n$ is the distance from sensor element $x_0$ to sensor element $x_n$, $\psi_i$, is the angle of incidence of interferer i on sensor array 201, and c is the speed of propagation of interferer i as it approaches sensor array 201.

Similarly, $$v_2 = \frac{I_2 - (v_1, I_2)v_1}{\sqrt{|I_2|^2 + |(v_1, I_2)|^2}} \quad \text{(Eq. 8)}$$

where (A, B) is the inner product of A and B, and $$I_i = \begin{bmatrix} e^{i\omega\mu_{i,0}} \\ e^{i\omega\mu_{i,1}} \\ e^{i\omega\mu_{i,2}} \\ \vdots \\ e^{i\omega\mu_{i,M-1}} \end{bmatrix} \quad \text{(Eq. 9)}$$

As a final example, $$v_3 = \frac{I_3 - (v_1, I_3)v_1 - (v_2, I_3)v_2}{\sqrt{|I_3|^2 + |(v_1, I_3)|^2 + |(v_2, I_3)|^2}} \quad \text{(Eq. 10)}$$

$v_i$ for i>3 can be obtained using the Gram-Schmidt process.

After the intermediate product S'(t) is formed in step 405, then in step 406 each element in S'(t) must be divided by a correction factor to obtain the product S(t), which is ready for beamforming and in which the N interfering signals have been mitigated:

$$S_k(t) = \frac{S_k'(t)}{T_k} \quad \text{(Eq. 11)}$$

where $$S'(t) = \begin{bmatrix} S_0'(t) \\ S_1'(t) \\ \vdots \\ S_k'(t) \\ \vdots \\ S_{M-1}'(t) \end{bmatrix} \quad \text{(Eq. 12)}$$

$$S(t) = \begin{bmatrix} S_0(t) \\ S_1(t) \\ \vdots \\ S_k(t) \\ \vdots \\ S_{M-1}(t) \end{bmatrix} \quad \text{(Eq. 13)}$$

and $$T_k = 1 - \sum_{n=0}^{M-1} K_{k,n} e^{i\omega(\tau_n - \tau_k)} \quad \text{(Eq. 14)}$$

where $K_{k,e}$ is the element in the kth row and nth column of the matrix K which is obtained from:

$$K = \sum_{m=1}^{N} v_m v_m^\dagger \quad \text{(Eq. 15)}$$

and $$\tau_n = \frac{d_n \sin\phi}{c} \quad \text{(Eq. 16)}$$

After the column vector S(t) has been formed, then at step 407 the process of beamforming is performed by beamforming processor 207, which performs coherent summation of the M signals, $s_1(t)$ through $s_{M-1}(t)$, to obtain the output scalar S(t).

$$S(t) = B(\phi)S(t) \quad \text{(Eq. 17)}$$

where B(ϕ) is a row vector equal to:

$$B(\phi) = [\,1 \quad e^{i\omega\tau_1} \quad e^{i\omega\tau_2} \quad \ldots \quad e^{i\omega\tau_{M-1}}\,] \quad \text{(Eq. 18)}$$

It is to be understood that the above-described embodiments are merely illustrative of the invention and that many variations may be devised by those skilled in the art without departing from the scope of the invention. It is therefore intended that such variations be included within the scope of the following claims and their equivalents.

What is claimed is:

1. A method comprising:

receiving M signals, $x_0(t)$ through $x_{M-1}(t)$, at a frequency of ω radians/second at a sensor array comprising M spatially-disparate sensor elements, $x_0$ through $x_{M-1}$, wherein said M signals, $x_0(t)$ through $x_{M-1}(t)$, comprise a signal of interest incident on said sensor array at an angle $\phi$, and an interfering signal incident on said sensor array at an angle $\psi_1$;

transforming each of said M signals, $x_0(t)$ through $x_{M-1}(t)$, by a first factor based on $\omega$, $\psi_1$, the speed of propagation of said interfering signal, and the distance between said sensor elements, $x_0$ through $x_{M-1}$, to form M intermediate products $s'_1(t)$ through $s'_{M-1}(t)$; and transforming each of said M intermediate products $s'_1(t)$ through $s'_{M-1}(t)$ by a second factor based on $\omega$, $\phi$, $\psi_1$, the speed of propagation of said interfering signal, and the distance between said sensor elements, $x_0$ through $x_{M-}$, to form M signals, $s_1(t)$ through $s_{M-1}(t)$.

2. The method of claim 1 further comprising the step of beamforming by transforming each of said M signals $s_1(t)$ through $s_{M-1}(t)$ by a factor based on $\omega$, $\phi$, the speed of propagation of said interfering signal, and the distance between said sensor elements, $x_0$ through $x_{M-1}$.

3. The method of claim 1 wherein said M signals, $x_0(t)$ through $x_{M-1}(t)$, are electro-magnetic signals.

4. A wireless telecommunications base station comprising:

a sensor array for receiving M signals, $x_0(t)$ through $x_{M-1}(t)$, at a frequency of $\omega$ radians/second comprising M spatially-disparate sensor elements, $x_0$ through $x_{M-1}$, wherein said M signals, $x_0(t)$ through $x_{M-1}(t)$, comprise a signal of interest incident on said sensor array at an angle $\phi$, and an interfering signal incident on said sensor array at an angle $\psi_1$; and an interference rejection processor for transforming each of said M signals, $x_0(t)$ through $x_{M-1}(t)$, by a first factor based on $\omega$, $\psi_1$, the speed of propagation of said interfering signal, and the distance between said sensor elements, $x_0$ through $x_{M-1}$, to form M intermediate products $s'_1(t)$ through $s'_{M-1}(t)$; and for transforming each of said M intermediate products $S'_1(t)$ through $s'_{M-1}(t)$ by a second factor based on $\omega$, $\phi$, $\psi_1$, the speed of propagation of said interfering signal, and the distance between said sensor elements, $x_0$ through $x_{M-1}$, to form M signals $s_1(t)$ through $s_{M-1}(t)$.

5. The wireless telecommunications base station of claim 4 further comprising a beamforming processor for beamforming by transforming each of said M signals $s_1(t)$ through $s_{M-1}(t)$ by a factor based on $\omega$, $\phi$, the speed of propagation of said interfering signal, and the distance between said sensor elements, $x_0$ through $x_{M-1}$.

6. The wireless telecommunications base station of claim 4 wherein said M signals, $x_0(t)$ through $x_{M-1}(t)$, are electro-magnetic signals.

7. A method comprising:

receiving M signals, $x_0(t)$ through $x_{M-1}(t)$, at a frequency of $\omega$ radians/second at a sensor array comprising M spatially-disparate sensor elements, $x_0$ through $x_{M-1}$, wherein said M signals, $x_0(t)$ through $x_{M-1}(t)$, comprise a signal of interest incident on said sensor array at an angle $\phi$, and an interfering signal incident on said sensor array at an angle $\psi_1$; and transforming said plurality of signals, $x_0(t)$ through $x_{M-1}(t)$, by a matrix A to form an intermediate product $S'(t)$, where $S'(t)=AX(t)$, $X(t)$ is a column vector that equals:

$$X(t) = \begin{bmatrix} x_0(t) \\ x_1(t) \\ \vdots \\ x_{M-1}(t) \end{bmatrix}$$

$$A = J - \sum_{m=1}^{N} v_m v_m^\dagger$$

J is the identity matrix of rank M, $v_m$ is a row vector and $v_m^\dagger$ is the conjugate transpose of $v_m$, $$v_1 = \frac{l_1}{|l_1|}, \text{ so that } |v_1|^2 = 1$$

$$l_1 = \begin{bmatrix} e^{i\omega\mu_{1,0}} \\ e^{i\omega\mu_{1,1}} \\ e^{i\omega\mu_{1,2}} \\ \vdots \\ e^{i\omega\mu_{1,M-1}} \end{bmatrix}$$

and $$\mu_{i,n} = \frac{d_n \sin\psi_i}{c}$$

where $d_n$ is the distance from sensor element $x_0$ to sensor element $x_n$, and c is the speed of propagation of interferer i as it approaches said sensor array.

8. The method of claim 7 further comprising:

transforming each of said M intermediate products $s'_1(t)$ through $s'_{M-1}(t)$ by a second factor $T_k$ equal $$T_k = 1 - \sum_{n=0}^{M-1} K_{k,n} e^{i\omega(\tau_n - \tau_k)}$$

where $K_{k,e}$ is the element in the kth row and nth column of the matrix K which is obtained from:

$$K = \sum_{m=1}^{N} v_m v_m^\dagger$$

where $$\tau_n = \frac{d_n \sin\phi}{c}.$$

9. The method of claim 8 further comprising the step of beamforming by transforming S(t) by a factor $B(\phi)$, where S(t) is a column vector equal to:

$$S(t) = \begin{bmatrix} S_0(t) \\ S_1(t) \\ \vdots \\ S_k(t) \\ \vdots \\ S_{M-1}(t) \end{bmatrix}$$

and B(ϕ) is a row vector equal to:

$$B(\phi) = [\,1 \quad e^{i\omega\tau_1} \quad e^{i\omega\tau_2} \quad \cdots \quad e^{i\omega\tau_{M-1}}\,].$$

10. The method of claim 7 wherein said M signals are electro-magnetic signals.

11. A wireless telecommunications base station comprising:

a sensor array for receiving M signals, $x_0(t)$ through $x_{M-1}(t)$, at a frequency of ω radians/second comprising M spatially-disparate sensor elements, $x_0$ through $x_{M-1}$, wherein said M signals, $x_0(t)$ through $x_{M-1}(t)$, comprise a signal of interest incident on said sensor array at an angle ϕ, and an interfering signal incident on said sensor array at an angle $\psi_1$; and an interference rejection processor for transforming said plurality of signals, $x_0(t)$ through $x_{M-1}(t)$, by a matrix A to form an intermediate product S'(t), where S'(t)=AX(t), X(t) is a column vector that equals:

$$X(t) = \begin{bmatrix} x_0(t) \\ x_1(t) \\ \vdots \\ x_{M-1}(t) \end{bmatrix}$$

$$A = J - \sum_{m=1}^{N} v_m v_m^{\dagger}$$

J is the identity matrix of rank M, $v_m$ is a row vector and $v_m^{\dagger}$ is the conjugate transpose of $v_m$, $$v_1 = \frac{I_1}{|I_1|}, \text{ so that } |v_1|^2 = 1$$

$$I_1 = \begin{bmatrix} e^{i\omega\mu_{1,0}} \\ e^{i\omega\mu_{1,1}} \\ e^{i\omega\mu_{1,2}} \\ \vdots \\ e^{i\omega\mu_{1,M-1}} \end{bmatrix}$$

and $$\mu_{i,n} = \frac{d_n \sin\psi_i}{c}$$

where $d_n$ is the distance from sensor element $x_0$ to sensor element $x_n$, and c is the speed of propagation of interferer i as it approaches said sensor array.

12. The wireless telecommunications base station of claim 11 wherein said interference rejection processor is also for transforming each of said M intermediate products $s'_1(t)$ through $s'_{M-1}(t)$ by a second factor $T_k$ equal to:

$$T_k = 1 - \sum_{n=0}^{M-1} K_{k,n} e^{i\omega(\tau_n - \tau_k)}$$

where $K_{k,e}$ is the element in the kth row and nth column of the matrix K which is obtained from:

$$K = \sum_{m=1}^{N} v_m v_m^{\dagger}$$

$$\text{where } \tau_n = \frac{d_n \sin\phi}{c}.$$

13. The wireless telecommunications base station of claim 11 further comprising a beamforming processor for beamforming by transforming S(t) by a factor B(ϕ), where S(t) is a column vector equal to:

$$S(t) = \begin{bmatrix} S_0(t) \\ S_1(t) \\ \vdots \\ S_k(t) \\ \vdots \\ S_{M-1}(t) \end{bmatrix}$$

and B(ϕ) is a row vector equal to:

$$B(\phi) = [\,1 \quad e^{i\omega\tau_1} \quad e^{i\omega\tau_2} \quad \cdots \quad e^{i\omega\tau_{M-1}}\,].$$

* * * * *